United States Patent
Bloechl

(10) Patent No.: US 11,852,713 B1
(45) Date of Patent: Dec. 26, 2023

(54) REAL-TIME LOCATION SYSTEM USING DUAL WIRELESS COMMUNICATIONS PROTOCOLS IN A TIME DIFFERENCE OF ARRIVAL FRAMEWORK FOR RANGING BETWEEN NODES

(71) Applicant: Link Labs, Inc., Annapolis, MD (US)

(72) Inventor: Mark O. Bloechl, Annapolis, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 18/125,419

(22) Filed: Mar. 23, 2023

(51) Int. Cl.
*G01S 13/34* (2006.01)
*H04W 64/00* (2009.01)

(52) U.S. Cl.
CPC ......... *G01S 13/343* (2013.01); *H04W 64/006* (2013.01)

(58) Field of Classification Search
CPC ............................ G01S 13/343; H04W 64/006
See application file for complete search history.

(56) References Cited

U.S. PATENT DOCUMENTS

| | | | |
|---|---|---|---|
| 6,128,490 A | 10/2000 | Shaheen et al. | |
| 7,321,331 B2 | 1/2008 | Andric et al. | |
| 7,817,579 B2 | 10/2010 | Ramirez et al. | |
| 7,978,674 B1 | 7/2011 | Oroskar et al. | |
| 9,788,151 B2 | 10/2017 | Duan et al. | |
| 10,200,886 B2 | 2/2019 | Duan et al. | |
| 10,264,436 B1 | 4/2019 | Wohler et al. | |
| 10,408,917 B2 | 9/2019 | Ye et al. | |
| 10,444,321 B2 | 10/2019 | Pu et al. | |
| 10,708,970 B2 | 7/2020 | Bloechl et al. | |
| 10,779,118 B2 | 9/2020 | Duan et al. | |
| 10,845,451 B1 | 11/2020 | Bloechl | |
| 10,862,520 B1 | 12/2020 | Bloechl | |
| 11,200,805 B2 | 12/2021 | Ye et al. | |
| 11,259,143 B2 | 2/2022 | Duan et al. | |
| 11,259,144 B2 | 2/2022 | Duan et al. | |
| 11,470,448 B2 | 10/2022 | Ye et al. | |
| 11,519,999 B2 | 12/2022 | Rybalko et al. | |
| 2005/0288003 A1 | 12/2005 | Matsumura | |
| 2006/0160544 A1 | 7/2006 | Sun et al. | |
| 2008/0186231 A1* | 8/2008 | Aljadeff | G01S 5/06 342/387 |
| 2012/0295623 A1 | 11/2012 | Siomina et al. | |
| 2019/0135229 A1 | 5/2019 | Ledvina et al. | |
| 2019/0174332 A1 | 6/2019 | Duan et al. | |
| 2020/0106877 A1 | 4/2020 | Ledvina et al. | |

(Continued)

FOREIGN PATENT DOCUMENTS

WO 2022125393 A1 6/2022

*Primary Examiner* — Timothy X Pham
(74) *Attorney, Agent, or Firm* — Charles B. Lobsenz; Brian H. Buck; Potomac Law Group, PLLC

(57) ABSTRACT

Provided are a system and method for coordinating dual wireless communications protocols when implementing a time difference of arrival framework for ranging between nodes. A first of the protocols (e.g., BLE) can be used to initiate synchronization and measurement staging, while ensuing calculations according to such synchronization and measurement can be conducted according a second of the protocols (e.g., UWB). In these regards, transitioning between the aforementioned protocols can result in a conservation of air time involved in an entirety of TDOA processes, and thus a conservation of energy.

22 Claims, 3 Drawing Sheets

(56) References Cited

U.S. PATENT DOCUMENTS

| | | |
|---|---|---|
| 2020/0382902 A1 | 12/2020 | Ye et al. |
| 2020/0404450 A1 | 12/2020 | Duan et al. |
| 2021/0027631 A1 | 1/2021 | Ye et al. |
| 2021/0029493 A1 | 1/2021 | Duan et al. |
| 2021/0029500 A1 | 1/2021 | Ye et al. |
| 2021/0105736 A1* | 4/2021 | Tancerel ............ G01S 5/10 |
| 2021/0158637 A1 | 5/2021 | Kincaid et al. |
| 2021/0282112 A1* | 9/2021 | Zhan ............ H04W 64/00 |
| 2022/0011398 A1 | 1/2022 | Duan et al. |
| 2022/0013177 A1 | 1/2022 | Li et al. |
| 2022/0014875 A1 | 1/2022 | Rybalko et al. |
| 2022/0058950 A1 | 2/2022 | Ye et al. |
| 2022/0171012 A1 | 6/2022 | Duan et al. |
| 2022/0210620 A1* | 6/2022 | Wahl ............ G01S 5/10 |
| 2022/0268875 A1 | 8/2022 | Szebenyel et al. |
| 2022/0272488 A1 | 8/2022 | Pekhteryev et al. |
| 2022/0317235 A1 | 10/2022 | Ye et al. |
| 2022/0377752 A1 | 11/2022 | Zhbankov et al. |
| 2022/0386270 A1 | 12/2022 | Suresh |
| 2022/0390586 A1 | 12/2022 | Ye |
| 2022/0394660 A1 | 12/2022 | Werner et al. |
| 2023/0067130 A1 | 3/2023 | Duan et al. |
| 2023/0071850 A1 | 3/2023 | Ye et al. |
| 2023/0095932 A1* | 3/2023 | Ye ............ G01S 5/0263 455/440 |
| 2023/0106904 A1* | 4/2023 | Ljung ............ H04W 64/003 455/456.1 |
| 2023/0110357 A1* | 4/2023 | Kämäräinen ............ G01S 5/06 455/456.5 |
| 2023/0156424 A1 | 5/2023 | Lee et al. |

\* cited by examiner

REAL-TIME LOCATION SYSTEM USING DUAL WIRELESS COMMUNICATIONS PROTOCOLS IN A TIME DIFFERENCE OF ARRIVAL FRAMEWORK FOR RANGING BETWEEN NODES

FIELD OF THE DISCLOSURE

Disclosed embodiments relate to wireless communications systems and the operation thereof, and more specifically, to arranging sequencing for node localization across separate wireless communications protocols, where such sequencing enables conservation of energy consumption among involved wireless nodes.

BACKGROUND

Wireless communications protocols which are operative to enable the exchange of information between objects are varied in both their purposes and capabilities. Among such protocols are BLUETOOTH, BLUETOOTH LOW ENERGY (BLE), THREAD, and ULTRA-WIDEBAND (UWB). Each of such protocols can be advantageous for their respective utility, where that utility can be dictated by certain considerations. For example, BLE may have various utility in circumstances where energy consumption is of paramount importance given that operable nodes lay dormant in between on-air connections. As another example, nodes which are operable according to the UWB protocol can achieve a far narrower scope of ranging estimation than that which can be obtained when implemented by BLE governed nodes Yet, due to such superiority in ranging, energy consumption by UWB nodes may be at a premium. This is particularly the case where localization according to UWB is achieved according to a time difference of arrival (TDOA) regime as against localization using time of flight (TOF), i.e., two-way ranging (TWR), where the distance between nodes is deduced from the roundtrip flight time of signaling therebetween. In this regard, it is well-recognized that ranging errors in real-time location systems (RTLS) implementing TDOA can significantly skew desired accuracy when contributory ranging nodes are not synchronized in their respective transmissions of ranging signaling. In other words, since TDOA is dependent upon determining respective node location due to an analysis of arrival times of spatially separated signaling, it is necessary to time synchronize that signalizing to ensure analysis of a same time signal. In known implementations of such synchronization, synchronized UWB receivers can scan for and timestamp transmissions of a tag to be located. As a result, these transmissions can then be forwarded to a central location where reception time differences are compared to determine a location of the tag, i.e., through known hyperbolic intersection of the transmissions. Sometimes, however, synchronization of these receivers to a required resolution can be difficult, such that clock distribution is required. Further, a node to be located can be left without any indication that its signaling has been received in some instances. Such difficulty can arise, for example, when an insufficient number of receivers acquire transmissions from the tag, thus causing the tag to repeatedly transmit until such time that it has received a sufficient number of corresponding acknowledgements of its signaling.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments herein may include a system and commensurate method providing a real-time location system (RTLS), including at least one tag, and a beacon pod comprising a master beacon (MB) and at least first through third slave beacons (SBs), in which each beacon is communicable with the at least one tag to enable the tag to determine a location thereof according to a time difference of arrival (TDOA) framework. In the time difference of arrival (TDOA) framework, each of the at least one tag, the MB, and the SBs include first and second wireless communications protocols (P1, P2) used interchangeably by the MB and the SBs to execute (a) synchronization among the MB and the SBs and (b) a TDOA measurement frame with respect to the at least one tag.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
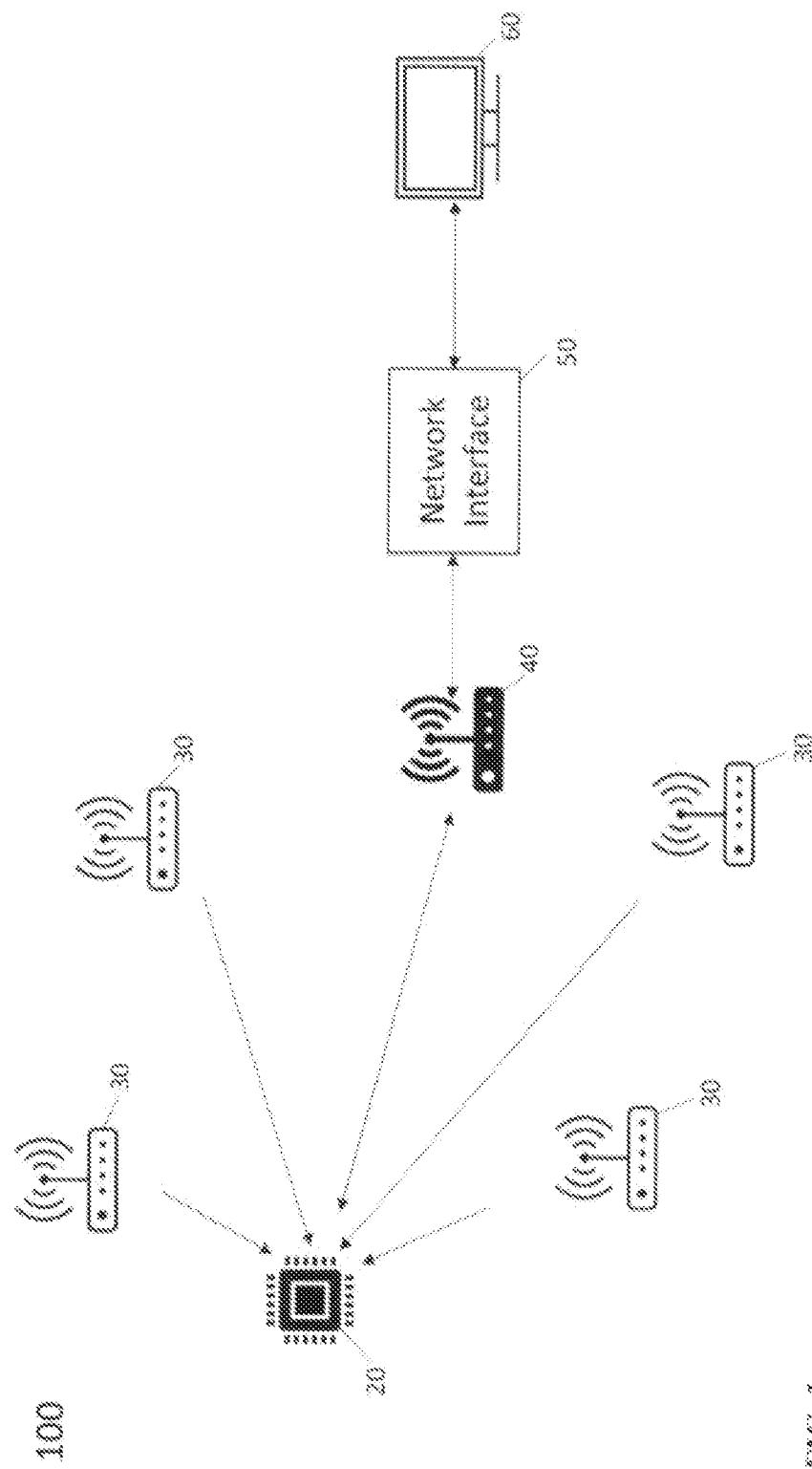
FIG. 1 is an illustration of a system providing wireless communications in accordance with embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless dearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shad only be interpreted as indicating exclusive alternatives (i.e. "one or the other but not both") when preceded by terms of exclusivity, such as "either," "one of," "only one of," or "exactly one of "Consisting essentially of," when used in the claims, shad have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shah be dosed or semi-dosed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

As will be discussed, embodiments herein may encompass signaling on one or more devices equipped according to an "XLE" wireless communications protocol, wherein such protocol is a low energy consumption protocol such as BLE or THREAD, and otherwise a UWB protocol, or, for example, on a combination of such protocols relative to selective operations between system nodes (i.e., wireless communications nodes (WONs)) that exchange such signaling.

Referring to FIG. 1, a description of a communications system 100 according to an embodiment is provided. System 100 and its components may each be configured to be operable in accordance with one or more of CLE and UWB protocols, such that each of the aforementioned components are configured for communications according to a selected one of such protocols at a first time and the other of such protocols at a second time. System 100 typically includes multiple tags 20—only one is shown in FIG. 1 for clarity. Tag 20 may be attached to or associated with a particular object for the purposes of tracking a changing location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30. In some implementations, one or more of the beacons 30 shown in FIG. 1 may be aggregated into a beacon pod 35 comprising a master beacon (MB) and one or more, optionally three (3), slave beacons (SBs) for purposes as later described herein.

System 100 may also include one or more access points 40. These access points 40 may also serve in the same capacity as one or more beacons in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing any coordinate location determination process locally and then reporting the location determination to system 100 via a communication to an access point 40 (or a beacon 30), In an embodiment, each tag 20 may individually report such a corresponding location determination via its own respective backhaul. See, for example, U.S. Pat. No. 10,264,436 entitled, "BLE NETWORKING SYSTEMS AND METHODS PROVIDING CENTRAL AND PERIPHERAL ROLE REVERSAL WITH INDEPENDENT PERIPHERAL NETWORK CONNECTIVITY," which is commonly owned by the assignee of the present application and incorporated by reference herein.

Figure 2:
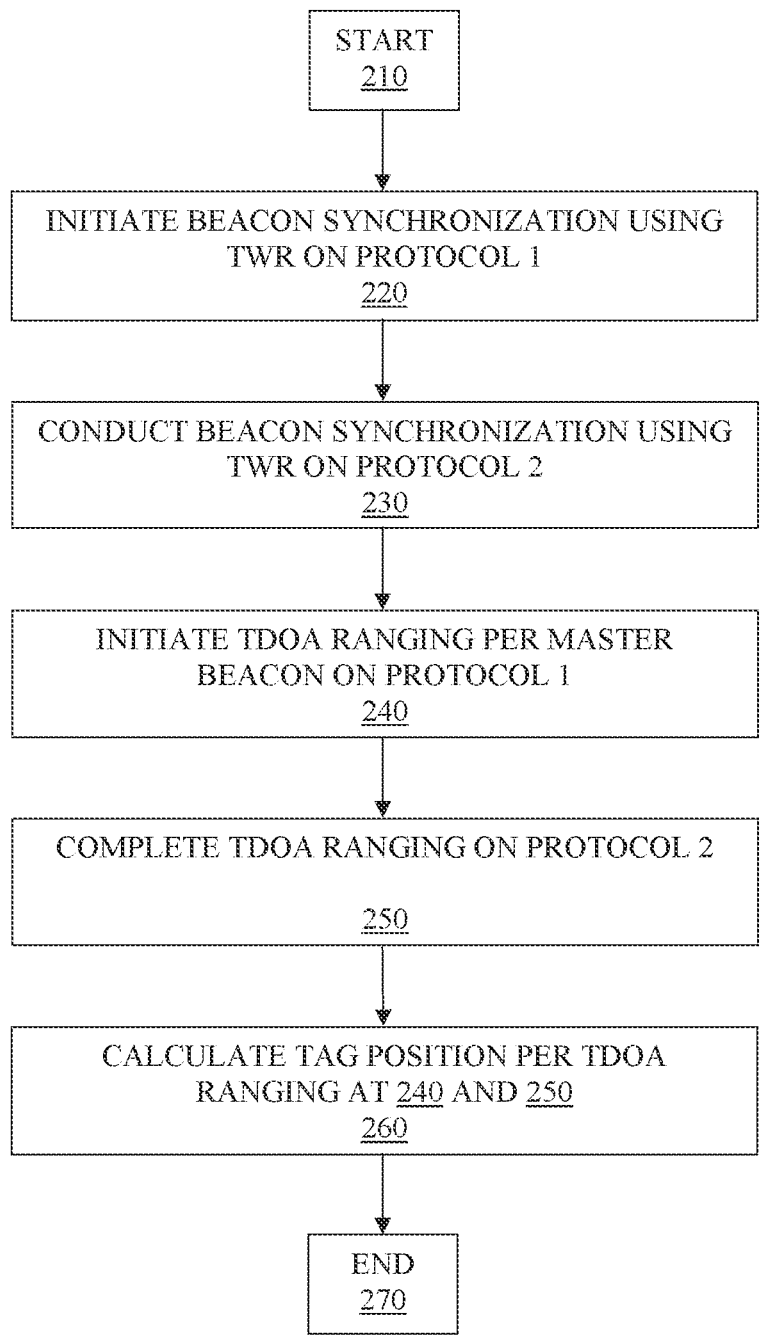
FIG. 2 is a sequence diagram stating, in accordance with the system of FIG. 1, a manner of arranging sequencing for node localization across separate wireless communications protocols.

In this regard and when referring to FIG. 2, XLE communications between a tag 20 and a beacon 30 may occur according to a "role reversal" where the tag is responsible for determining its location, i.e., after first receiving a beacon advertisement that can be a trigger for the location determination process to begin at the tag 20. An exemplary discussion of one or more aspects which are descriptive of the reversal are provided in U.S. Pat. No. 10,708,970 entitled, "BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL," which is commonly owned by the assignee of the present application and incorporated by reference herein. Analogously, a respective tag and beacon 30 pair may, according to embodiments herein, execute such same role reversal so as to thereafter employ UWB communications following the aforesaid XLE communications.

It is to be understood by one of ordinary skill in the art that each of the tag and beacon 30 may be implemented by all appropriate software and/or hardware for carrying out location technologies included in the discussion herein, e.g., TOF and/or TDOA measurements according to respectively designated XLE or UWB protocol.

In the carrying out of processes according to these technologies, it can be of the utmost benefit to weigh energy consumption according to wireless communications protocols with which each of a tag 20 and a beacon 30 (or beacons 30 of a beacon pod 35) may be equipped. Such weighing, for instance, may be impacted by certain constraints of one or more of these protocols, e.g., line of sight impediments which are characteristic of UWB. That is, it can be beneficial to first attempt communications between nodes according to a protocol, such as XLE, which is freed of these and other impediments when first attempting the establishment of communications between nodes. In a case when the communications are thus established, further operable protocol, such as UWB, can then be employed. In this way, implementation of the initial communication can reduce energy consumption (e.g., by avoiding line of sight impediment(s)) where, for instance and as is understood, XLE communication can be more economical than that of UWB in a process of, for example, establishing TWR.

On the basis of such economy, and where clock synchronization among nodes is crucial to accuracy in localization according to a TDOA regime, employing TWR in an initial stage targeted at obtaining that synchronization presents, according embodiments herein, an optimization for energy consumption. As such, relevant synchronization aimed at achieving accuracy in TDOA measurement at a tag 20 is now discussed with regard to a manner of arranging sequencing for localization techniques (e.g., TWR and TDOA) across separate wireless communications protocols (e.g., XLE including BLE or THREAD as protocol 1, and UWB as protocol 2).

Beginning at 210, a MB, of a beacon pod 35, is configured to, at 220, initiate according to XLE, or protocol 1, an advertisement intended for obtaining synchronized transmission dock cycling among slave beacons (SBs) of the relevant pod (here, shown as Slave Beacon 1, 2, and 3). The advertisement may include a synchronization flag indicating that the purpose of the advertisement is dock synchronization with the MB and targeted at a particular SB according to its media access control (MAC) address. Such advertisement is repetitively transmitted until such time as acknowledged by the targeted SB.

The acknowledgement may comprise a request by the identified SB to begin the synchronization process in response to the SB detecting the synchronization flag. One or more parameters of the advertisement may comprise that the synchronization, according to the transmitted request, be conducted according to TWR as between the MB and the targeted SB on a differing protocol, i.e., protocol 2 or UWB. In this regard, the MB may, at 230, open transmit and receive windows for an exchange of TWR signaling to determine a TOF between the MB and the targeted SB. As is contemplated with respect to a given beacon pod 35, such exchanges may occur, in succession, as between the MB and each of included SBs. In other words, the sequence of protocol 1 and protocol 2 communications between the MB and a respective SB may be discretely repeated for each SB within the beacon pod 35, and where the TOF synchronization amount as to each SB is stored by the MB and such SBs. Once synchronization with each of the SBs in a respective pod 35 is complete, the MB may initiate, as at 240, TDOA ranging on protocol 1. That is, such a MB may begin signaling for a TDOA measurement frame so as to provide each of the SBs and tag 20 in receipt thereof an initial reference time, $t_{n0}$ (i.e., an initial reception time for the frame at a respective node). Here, advertisements attributable to the MB lack the aforementioned synchronization flag, i.e., such a flag is absent from the advertisements. Thus, as a result of this initial reference time being received at the tag 20 and each SB transmitting respective signaling in accordance with scheduling thereof, the tag 20 may then be operative to determine its location according to a TDOA regime, according to protocol 2. The scheduling of signal transmission from each of the SBs may be in accordance with the following: $t_n = t_{n0} - \Delta_{n0} + (n \times d)$, where $t_n$ represents transmission timing for a respective SB, $t_{n0}$ represents the frame reference transmission time of the MB, $\Delta_{n0}$ represents the measured transmission delay between the MB and a respective SB (i.e., the TOF between the MB and such respective SB determined during synchronization at 230 and representing a synchronization amount as between a SB and the MB), n is the relative SB indication (e.g., $1^{st}$, $2^{nd}$, etc. according to for, example, MAC identification) within a pod 35, and d represents a constant delay timing as indicated by the MB in its protocol 1 transmission that began the TDOA measurement frame. That is, d can represent a delay between when the MB first begins its TDOA protocol 2 transmission and when a respective SB is scheduled to begin its TDOA protocol 2 transmission according to the $\Delta_{n0}$ synchronization amount setting a time for such transmission, With this scheduling in place, each of the SBs can transmit to the tag 20 according to protocol 2 so as to complete, as at 250, a beacon portion of the TDOA ranging, i.e., as between constituent SBs of the beacon pod 35 and the tag 20 due to an initial transmit by the MB on protocol 2 having been received by each of the SBs and the tag 20.

Given that each SB has implemented its associated synchronization amount relative to MB transmission during synchronization in order to thus shift it scheduled protocol 2 TDOA transmission to the tag 20, synchronization between the MB and each SB is achieved from the tag's perspective. Accordingly, the tag may proceed to, as at 260 and prior to ending sequencing operations at 270, calculate its position per the TDOA ranging at 240 and 250. For instance, as is explained with reference to FIG. 3, as described below, the tag 20 can delineate a beginning of the TDOA frame (as represented by an initial protocol 1 transmission from the MB lacking the synchronization flag) to derive each individual SB transmission time. As is discussed in more detail below, timing for each such individual SB transmission can be determined according to the above referenced $\Delta_{n0}$, representing a synchronization amount as between the MB and each SB. Such an amount, in providing a temporal shift compensating for a transmission time delay as between the MB and a respective SB, can further be accounted for in the constant delay d defining a difference in MB and SB protocol 2 transmissions.

Figure 3:
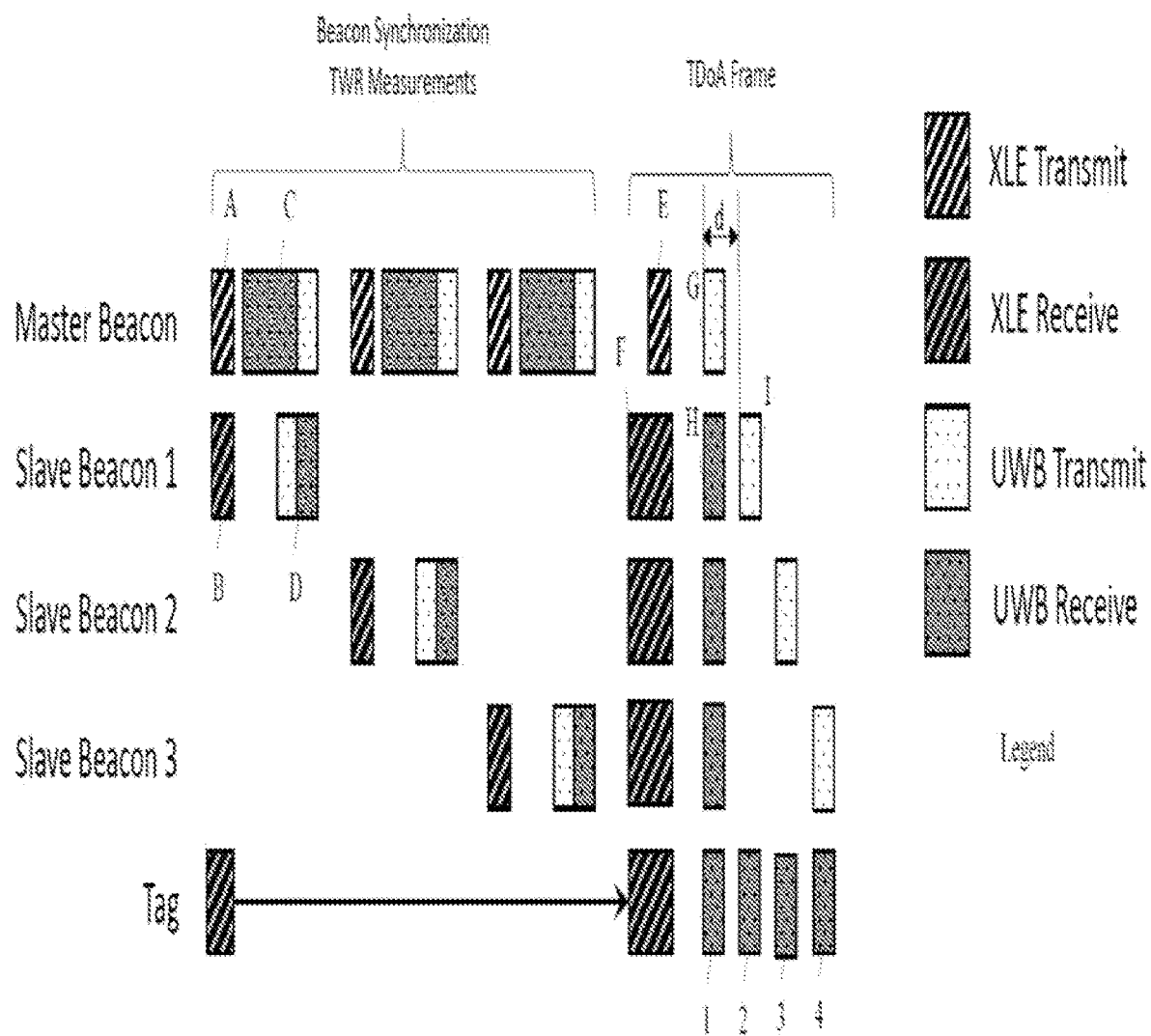
FIG. 3 is a schematic diagram illustrating communications among various system nodes of FIG. 1, in accordance with the sequencing of FIG. 2.

In referring to FIG. 3 providing a schematic diagram illustrating communications among various system nodes of FIG. 1, in accordance with the sequencing of FIG. 2, there is detailed a diagrammatic representation of beacon synchronization and TDOA signaling as between beacons, of a beacon pod 35, and the tag 20.

Diagrammatically, therefore, there is illustrated MB-SB synchronization operations in conjunction with the aforementioned TDOA measurement frame enabling a tag 20 to conduct TDOA ranging aimed at enabling that tag 20 to determine its location relative to signaling transmitted by a MB and SBs of a beacon pod 35. In an exemplary fashion, each of the MB and SB are listed as denoted, as is the tag 20.

Therein, synchronization as between the MB and the each constituent SB is initiated according to protocol 1, or XLE, and then transitioned to protocol 2, or UWB, when determining a TWR measurement as between the MB and a respective SB. For simplicity, a cycle of transmissions "A" through "D" are explicitly illustrated as between the MB and SB 1, wherein such a cycle can be respectively repeated according to a MB advertisement indicating a successive respective SB (e.g., SB2 or SB3) according to MAC identification and included synchronization flag. As such, the aforementioned cycling can begin at "A" where the MB transmits an advertisement that is acknowledged by the respective SB1, at "B" to begin TWR as a result of detection of the synchronization flag. In response, the MB and SB 1 may engage in an exchange of transmissions, at "C" and "D" and according to protocol 2 to a establish a TOF measurement therebetween. As a result, the MB and SB1 record such measurement for purposes of TDOA ranging, as is later described. Throughout, the tag 20 lays dormant in view of detection of the synchronization flag requiring synchronization measurement among the MB and the SBs.

Once having cycled through constituent SBs of its constituent beacon pod 35, the MB then reverts to protocol 1, as is shown, to emit signaling, as at "E," setting parameters for a TDOA frame as between each of the pod SBs and the tag 20, as received commonly by SB1-SB3 and tag 20 at shown iterations of "F." Owing to not detecting the synchronization flag from the MB advertisement, the tag 20 is caused to open receive windows according to protocol 2, and each SB is caused to transmit signaling to the tag 20 according to protocol 2 (as described below). This is the case since such an MB advertisement indicates that one of such parameters includes conducting TDOA measurements as between the MB, SBs and the tag 20 according to protocol 2. As such, the MB can broadcast its advertisement for receipt by the pod SBs at indicated iterations of "H" and by the tag 20 at "1." Thereafter, and in order to maintain synchronization with the MB, SB1 transmits at "I" according to its above referenced timing, $t_n$, that implements its synchronization amount, $\Delta_{n0}$. That is, SB1 shifts its transmission timing so as to be offset from the MB advertisement by the amount "d," representing the constant delay indicated by the MB in its protocol 1 transmission at "E" for each respective beacon. In this way, "d" can equate to a difference in timing between a timing of the MB transmission at "G" and a timing for a respective SB transmission at a respective iteration of "I." In other words, "d" can, in some embodiments, encompass the synchronization amount, $\Delta_{n0}$, that enables synchronization between the MB and a respective SB. Upon transmission, tag can receive the SB1 transmission at "2." Thus, as may be understood, relative synchronization amounts for transmissions from SB2 and SB3 can be "2d" and "3d," respectively, as measured from "G" for respective transmissions "I," corresponding to SB2 and SB3, and received at "3" and "4," Aspects of relative interactions between a MB and a SB of a beacon pod 35 herein can, with synchronization for time of transmission being compared to phase-coherence, parallel interactions occurring between master and slave beacons as are provided in U.S. Pat. No. 11,412,472 entitled, "SYSTEM AND METHOD FOR GENERATING PHASE-COHERENT SIGNALING VIA CALIBRATED PHASE SYNCHRONIZATION FACTORS AMONG WIRELESS RANGING NODES IN A PHASE-BASED TIME DIFFERENCE OF ARRIVAL FRAMEWORK," which is commonly owned by the assignee of the present application and incorporated by reference herein.

Having received the MB's protocol 2 transmission at "1" and each respective SB1-SB3 transmission at "2" through "4," respectively, the tag 20 is equipped to simply subtract an appropriately corresponding magnitude of "d" from each SB timestamp at "2" through "4" when evaluating its position according to a conventional TDOA analysis. Accordingly, where the delay "d" can encompass the above-discussed synchronization amount $\Delta_{n0}$, the tag 20 can perceive each SB transmission as having been emitted precisely at a timing marked by a respectively corresponding interval of "d."

In view of the above, it can be understood that dual use of wireless protocols in a TDOA ranging framework can forego energy expenditure other wise necessary to achieve node synchronization according to UWB operations alone. This is particularly the case as a result of initiating such synchronization according to a lesser energy consuming wireless protocol such as the XLE protocol described herein (e.g., BLE). In other words, enhanced efficiency can be provided in at least a two-fold regime, where (1) synchronization among beacons and a TDOA frame for ranging can be initiated according to the XLE protocol and (2) measurements for such synchronization (e.g., TWR) and TDOA ranging, itself, can be conducted according to UWB protocol so as to reap the benefits of its logistical accuracy determination(s).

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A real-time location system (RTLS), comprising:
at least one tag; and
a beacon pod comprising a master beacon (MB) and at least first through third slave beacons (SBs), in which each beacon is communicable with the at least one tag to enable the tag to determine a location thereof according to a time difference of arrival (TDOA) framework, wherein
in the time difference of arrival (TDOA) framework, each of the at least one tag, the MB, and the SBs comprise first and second wireless communications protocols (P1, P2) used interchangeably by the MB and the SBs to execute (a) synchronization between the MB and the SBs according to cycling of signaling between the MB and the SBs on the P1 and the P2 and (b) a TDOA measurement frame with respect to the at least one tag; and
wherein
throughout the TDOA measurement frame, the MB and the SBs communicate with the at least one tag unidirectionally from the MB and the SBs to the at least one tag and the at least one tag determines the location thereof based on the unidirectional communications and according to the TDOA framework.

2. The RTLS of claim 1, wherein:
the synchronization among the MB and the SBs is initiated by the MB according to a P1 transmission, to the first SB, comprising a synchronization flag.

3. The RTLS of claim 2, wherein:
the P1 comprises BLUETOOTH LOW ENERGY.

4. The RTLS of claim 3, wherein:
in response to receipt of the P1 transmission, the MB and the first SB engage in two-way ranging (TWR) according to the P2 to obtain a time of flight (TOF) synchronization amount corresponding to the first SB with respect to the MB, the synchronization amount being stored by the first SB and the NIB.

5. The RTLS of claim 4, wherein:
the P2 comprises ULTRA-WIDEBAND (UWB).

6. The RTLS of claim 5, wherein:
upon concluding communications with the first SB according to the P2, the MB reverts to successive individual cycles of communications with remaining SBs of the beacon pod, in which each of the cycles is initiated by the MB according to the P1 followed by TWR according to the P2 to obtain respective TOF synchronization amounts corresponding to the remaining SBs, the synchronization amounts being respectively stored by the remaining SBs and the MB.

7. The RTLS of claim 6, wherein:
upon concluding TDOA synchronization among the MB and SBs of the beacon pod, the MB initiates the TDOA measurement frame with respect to the at least one tag by transmitting an advertisement, according to the P1 and without the synchronization flag, the absence of the synchronization flag causing (c) the at least one tag to receive MB and SB transmissions according to the P2 during the TDOA measurement frame and (d) the SBs of the beacon pod to, in response to receipt of signaling by the MB according to the P2 during the TDOA measurement frame, transmit P2 signaling to the at least one tag according to a respectively corresponding SB transmission delay (d) included in the advertisement.

8. The RTLS of claim 7, wherein:
following transmission of the advertisement according to the P1 and without the synchronization flag, the MB transmits signaling to each of the at least one tag and the SBs of the beacon pod according to the P2.

9. The RTLS of claim 8, wherein:
in response to receiving the signaling transmitted by the MB according to the P2, each of the SBs of the beacon pod transmit signaling to the at least one tag on the P2 according to the respectively corresponding SB transmission delay (d).

10. The RTLS of claim 9, wherein:
each respectively corresponding SB transmission delay (d) comprises the TOF synchronization amount corresponding to synchronization between the MB and the transmitting SB.

11. The RTLS of claim 10, wherein:
the at least one tag determines the position thereof according to the TDOA framework by subtracting, from each received timestamp of signaling by a transmitting SB, the respective SB transmission delay (d) associated with that signaling.

12. A method of determining a tag location according to a real-time location system (RTLS), the method comprising:
providing at least one tag; and
providing a beacon pod comprising a master beacon (MB) and at least first through third slave beacons (SBs), in which each beacon is communicable with the at least one tag to enable the at least one tag to determine a location thereof according to a time difference of arrival (TDOA) framework,
wherein
in the time difference of arrival (TDOA) framework, each of the at least one tag, the MB, and the SBs comprise first and second wireless communications protocols (P1, P2) used interchangeably by the MB and the SBs to execute (a) synchronization between the MB and the SBs according to cycling of signaling between the MB and the SBs on the P1 and the P2 and (b) a TDOA measurement frame with respect to the at least one tag; and
wherein
throughout the TDOA measurement frame, the MB and the SBs communicate with the at least one tag unidirectionally from the MB and the SBs to the at least one tag and the at least one tag determines the location thereof based on the unidirectional communications and according to the TDOA framework.

13. The method of claim 12, wherein:
the synchronization among the MB and the SBs is initiated by the MB according to a P1 transmission, to the first SB, comprising a synchronization flag.

14. The method of claim 13, wherein:
the P1 comprises BLUETOOTH LOW ENERGY.

15. The method of claim 14, further comprising:
in response to receiving the P1 transmission, the MB and the first SB engaging in two-way ranging (TWR) according to the P2 to obtain a time of flight (TOF) synchronization amount corresponding to the first SB with respect to the MB, the synchronization amount being stored by the first SB and the MB.

16. The method of claim 15, wherein:
the P2 comprises ULTRA-WIDEBAND (UWB).

17. The method of claim 16, further comprising:
upon the MB concluding communications with the first SB according to the P2, the MB reverting to successive individual cycles of communications with remaining SBs of the beacon pod, in which each of the cycles is initiated by the MB according to the P1 followed by TWR according to the P2 to obtain respective TOF synchronization amounts corresponding to the remaining SBs, the synchronization amounts being respectively stored by the remaining SBs and the MB.

18. The method of claim 17, further comprising:
upon concluding TDOA synchronization among the MB and SBs of the beacon pod, the MB initiating the TDOA measurement frame with respect to the at least one tag by transmitting an advertisement, according to the P1 and without the synchronization flag, the absence of the synchronization flag causing (c) the at least one tag to receive MB and SB transmissions according to the P2 during the TDOA measurement frame and (d) the SBs of the beacon pod to, in response to receipt of signaling by the MB according to the P2 during the TDOA measurement frame, transmit P2 signaling to the at least one tag according to a respectively corresponding SB transmission delay (d) included in the advertisement.

19. The method of claim 18, further comprising:
following transmission of the advertisement according to the P1 without the synchronization flag, the MB transmitting signaling to each of the at least one tag and the SBs of the beacon pod according to the P2.

20. The method of claim 19, further comprising:
in response to receiving the signaling transmitted by the MB according to the P2, each of the SBs of the beacon pod transmitting signaling to the at least one tag on the P2 according to the respectively corresponding SB transmission delay (d).

21. The method of claim 20, wherein:
each respectively corresponding SB transmission delay (d) comprises the TOF synchronization amount corresponding to synchronization between the MB and the transmitting SB.

22. The method of claim 21, wherein:
the at least one tag determines the position thereof according to the TDOA framework by subtracting from each received timestamp of signaling by a transmitting SB, the respective SB transmission delay (d) associated with that signaling.

\* \* \* \* \*